Sept. 26, 1961   J. X. GREEN ET AL   3,002,168
POTENTIOMETER
Filed Nov. 13, 1959   2 Sheets-Sheet 1

INVENTOR:
James X. Green
Keith L. Herbert

Smyth & Roston
Attorneys

Sept. 26, 1961   J. X. GREEN ET AL   3,002,168
POTENTIOMETER
Filed Nov. 13, 1959   2 Sheets-Sheet 2
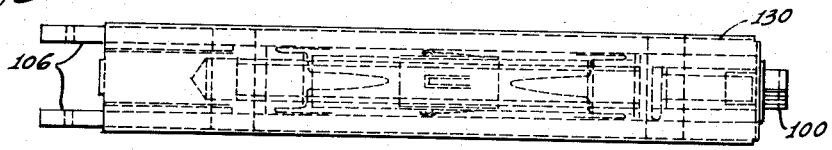
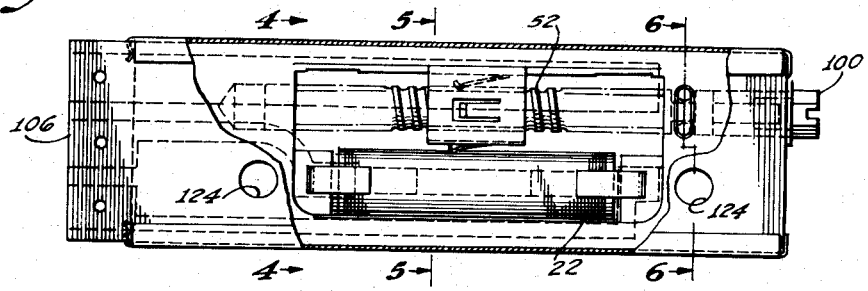
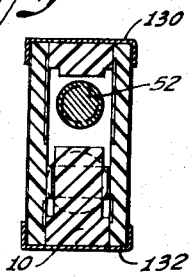 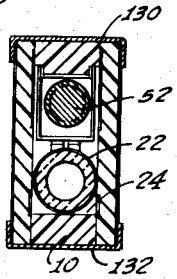 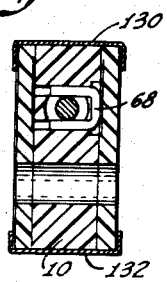
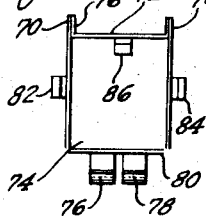 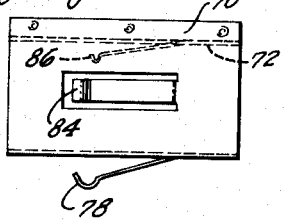 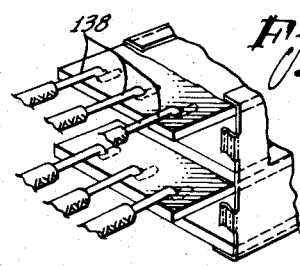
INVENTORS:
James X. Green,
Keith L. Herbert
By Smyth & Roston
Attorneys United States Patent Office 3,002,168
Patented Sept. 26, 1961

3,002,168
POTENTIOMETER
James X. Green, Burbank, and Keith L. Herbert, Inglewood, Calif., assignors, by mesne assignments, to Airline Electric, Inc., Gardena, Calif., a corporation of California
Filed Nov. 13, 1959, Ser. No. 852,691
3 Claims. (Cl. 338—180)

This invention relates to slidable electrical contact devices of the type which are particularly adapted for use in the construction of linear potentiometers, sometimes referred to as "trim pots."

The guidance and communication systems of present day missiles and pilotless aircraft ordinarily include among the electronic components, a number of potentiometers upon which the proper functioning of such systems, and the vehicles themselves are largely dependent.

Because of extreme limitations on the weight of, and volume occupied by all equipment in these space vehicles, it has been necessary to devise miniature electronic components, including potentiometers. However, diminution in the size of these important devices has heretofore been accomplished at some sacrifice in reliability.

Among the requirements for suitable potentiometers for use in space vehicles is ability to maintain their preset resistance values despite the high acceleration and extreme variance in environmental conditions, such as temperature, humidity, air density, etc., to which they will be subjected. Desirably, the variable contacting portions of the devices should be well encased, and so constructed as to prevent interruption or change of contact except in accordance with intended manual adjustment.

However, despite all precautions which have heretofore been taken to produce as rugged a potentiometer as possible within permissible weight and space limitations, failures have occurred in electronic equipment, which failures been traceable to malfunctioning of the contacts between the resistance element and the parallel conduit ordinarily found in the potentiometers of the type heretofore preferred. Any improvement in this area of such potentiometers is highly desirable.

For example, the failure rates due to open connections and bad contact surfaces has, in known military cases, approached one part in four. The best potentiometers heretofore available generally are found to have failure rates of 1%, and only very exceptionally, rates of .1%. Yet failure rates no higher than .05% are required to assure adequate performance of equipment for use in which this particular type of potentiometer is intended.

The miniature size of such potentiometers has, moreover, made them difficult to mass produce reliably. Potentiometer designs heretofore utilized have involved at least several soldered connections of very fine wires. Such connections will occasionally be found to be faulty after assembly of the unit, whereupon the unit must be taken apart and the faulty connection located and remedied. Also, soldering such wires accurately requires a high degree of skill.

Another difficulty with the potentiometers heretofore employed lies in the fact that, due to the small size of the devices, considerable difficulty has been experienced in providing good external connecting means whereby the potentiometers may be incorporated in the desired circuit.

Potentiometers of this type should also be constructed in such a manner that a number of them may be placed together in a stack for connection into the circuit, either in parallel, in series, or separately.

The present invention, as applied to potentiometers of the type described, represents a solution of the foregoing problems and provides a substantial increase in the reliability of such devices.

Essentially, the present invention accomplishes a marked reduction in the failure rate of electrical devices, such as potentiometers, by duplicating the connections and contacts at the four principal points at which failure have been known to occur. Such duplication reduces failure rates by the square of the rate of failure of previously produced potentiometers. Thus, if the failure rate of a unit has been 1%, the present construction enables the failure rate of such a unit to be reduced to .01%, a rate which is quite acceptable and far below that of any heretofore known practical device for the use for which such potentiometers are intended.

The particular embodiment of the present invention which is herein illustrated and described, is in the form of a potentiometer having a linear resistance element the resistance of which is varied by the movement of a wiper contact along said element, and the movement of the wiper contact of which is accomplished by the rotation of a screw member which is disposed parallel to the resistance element.

The wiper contacting member is provided not only with dual contacting arms which are spring-urged onto the resistance element, but also with a pair of oppositely extending lateral arms which simultaneously contact a pair of conductive areas connected in parallel, one of which areas is brought outside the unit for circuit connection. Additionally, each of the extremities of the resistance element is placed by clip contact means in connection with a pair of oppositely disposed conduit areas, which areas are separated from the first mentioned conductive area and from each other.

In the preferred embodiment of the invention, the resistance element, the screw, and the contact member are contained in the cavity of a dielectric block, which cavity extends through the block and is closed on each side by a dielectric plate, the inner face of which plate being coated with the several conductive areas. The block and closure plates are held together by clip members, the edges of which extend over the plates and are spot welded to copper plating provided on the outsides of the plates.

It will be appreciated that the present invention desirably accomplishes the duplication of contacts and connections at no substantial increase in the size and weight of the unit. This duplication, moreover, effects a marked reduction in noise of the potentiometer.

Further, the item may readily be mass produced, since its parts may be fabricated separately by machines, and then assembled quickly by hand by relatively unskilled labor.

The invention may be further understood by reference to the following detailed description of the preferred embodiment thereof with reference to the accompanying drawings in which:

FIG. 2 is a plan view;

FIG. 3 is a side elevation;

Figure 1:
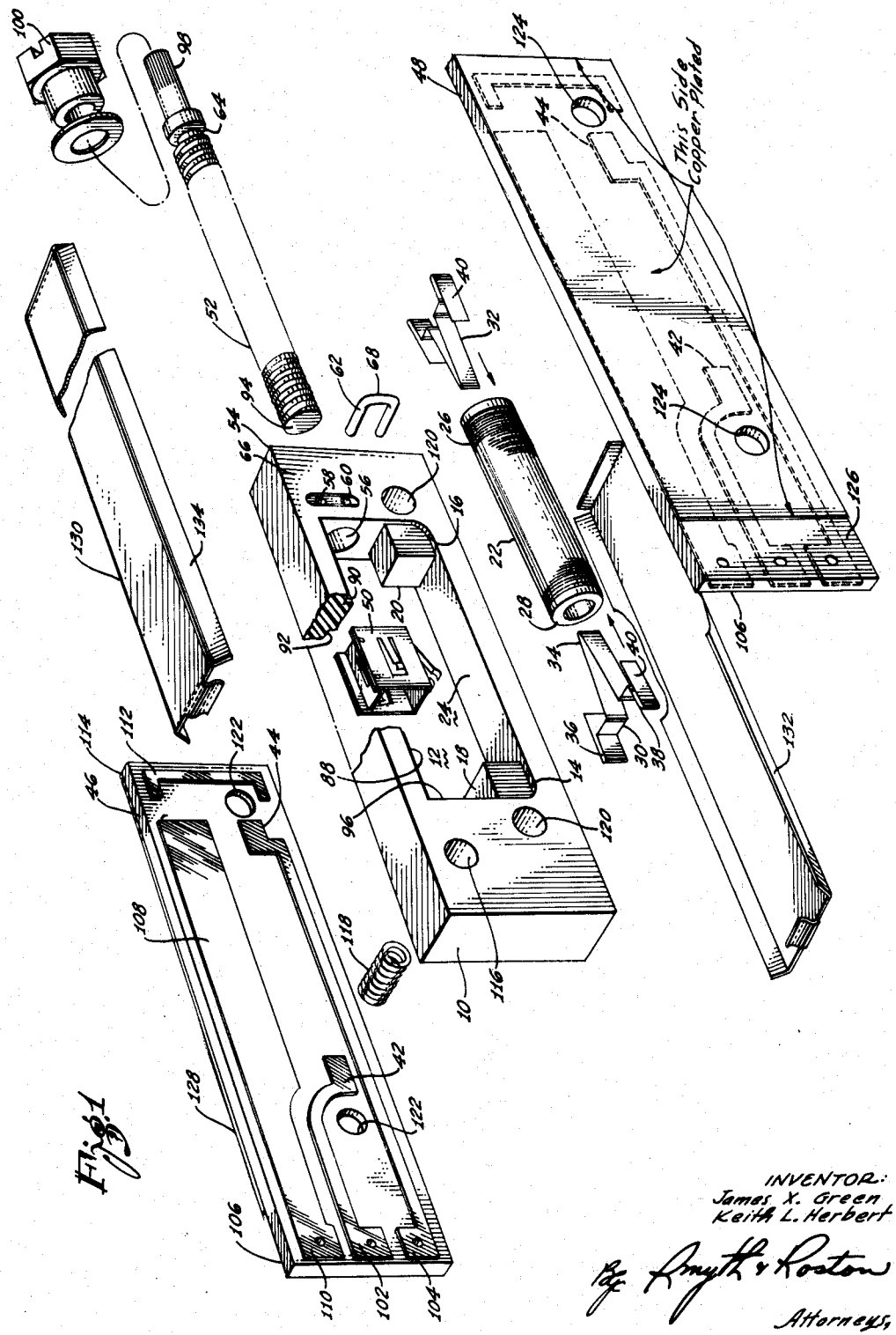
FIG. 1 is an exploded, enlarged perspective view of a potentiometer constructed in accordance with the invention.

FIGS. 4, 5 and 6 are sections taken respectively on the lines 4—4, 5—5 and 6—6 of FIG. 3;

FIG. 7 is an end view of the contacting member which rides upon the screw;

FIG. 8 is a side elevation of the contacting member; and

FIG. 9 is a perspective view of the ends of a pair of stacked potentiometers of the type illustrated in FIGS. 1–8, but with the end of one closure wall snapped off to permit connections to be made thereto.

Referring to FIG. 1 of the drawings, which figure best shows all of the parts of the preferred embodiment of the invention and their relation to each other upon assembly, the entire unit is assembled in and about a rectangular dielectric block 10, the central area of which is hollowed to provide a rectangular cavity 12. Within this cavity 12, at the two lower corners 14, 16, are provided a pair of anchoring cubes 18, 20, which are integrally formed with the block 10 and are of the same dielectric material.

A tubular resistance element 22, of a length just slightly less than the distance between the opposing faces of the cubes 18, 20, is provided and seated on the inner wall 24. This resistance element 22 is constructed of wire 26 wound about a ceramic tube 28, and is held in position between the cubes 18, 20, by means of a pair of specially shaped clips 30, 32.

Each of these clips is formed of a single piece of conductive metal, bent symmetrically about its transverse center line to provide a probe 34, which is insertable into one of the ends of the tube 28; and a pair of fingers 36, 38. The latter are drawn together with the insertion of the probe 34 into the end of the tube 28, thereby to clamp the outwardly facing sides of one of the cubes 18, 20. Each finger 36, 38 is further bent back upon itself to provide a contacting member 40, one side of which makes contact with the resistance wire on the end of the tube 28, and the other side of which serves to contact a conductive area 42 or 44 on one of the cover plates 46, 48, described more fully below.

Variance in the value of the resistance placed in circuit is accomplished by means of a slidable conductive contacting member 50. The end 54 of the block 12 is orificed at 56 to permit the screw 52 to be inserted into the cavity 12 and disposed parallel to the resistance element 22. This block end 54 is further transversely orificed at 58, 60 through to the most remote portion of the wall defining the axial orifice 56, to receive a U-shaped locking element 62, the arms of which, when the screw 52 is inserted through the orifice 56 and cavity 12, slide tangentially into an annular groove 64 provided on the neck of the screw 52. The area on the face 66 of the end 54 of the block 12, which area immediately surrounds and extends between the orifices 58, 60, is further recessed to a depth equal to the height of the cross member 68, thereby to enable the latter to be flushly inserted in the face 66.

The member 50 is further shown in detail in FIGS. 5, 7 and 8. As may be seen in these figures and FIG. 1, member 50 is formed as a short tube of rectangular cross section which is provided with a pair of flanges 70 extending upwardly on each side from the upper transverse wall 72. Preferably the member 50 may be constructed of a thin rectangular piece of metal which is folded along two lines (not shown) to produce a piece 74 having a U-shaped cross section. The upwardly protruding sides of this piece 74 are then spanned by a second piece of metal 76, which is folded similarly but to a lesser depth. The two pairs of upper edges of these pieces 74, 76 are then spot welded to form a single member of rectangular cross section with the upwardly protruding flanges, as stated above.

Prior to folding, the metal piece 74 is partially punched to break out from the metal surface a first pair of adjacent resilient contacting elements 77, 78, in what, upon folding, becomes the lower transverse wall 80; and a second pair of similar contacting elements 82, 84, one extending horizontally outwardly from each side wall of the member 50. The metal piece 72 is also similarly punched to provide a fifth downwardly protruding resilient contacting element 86.

The under side of the upper cavity defining wall 88 is longitudinally grooved at 90, 92 along each edge to receive slidably the flanges 70 of the member 50.

To assemble the cavity-contained portion of the unit, the resistance element 22 is first mounted between the cubes 16, 18 in a portion of the cavity 12 by means of the clips 30, 32. The contacting member 50 is then slipped into the cavity 12 and pressed upwardly until the flanges 70 are slidably seated in the grooves 90, 92. Thereupon the screw 52 is inserted through the orifice 56, and is threaded through the hollow portion of the member 50 until the end 94 of the screw abuts the vertical cavity-defining wall 96.

The downwardly protruding resilient element 86 will be found to press against the upper surface of the horizontally disposed screw 52.

The pressure of the element 86 on the screw thread, as best shown in FIG. 5, results in imparting a longitudinal movement through the cavity 12 to the member 50, upon rotation of the screw.

When the screw 52 is fully inserted through the cavity 12, the annular groove 64 falls in registry with the transverse orifices 58, 60. The screw may then be locked into position to prevent undesired withdrawal, by inserting the U-shaped locking element into the orifices 58, 60, and into the annular groove 64.

Suitable means for rotating the screw 52 may be provided, as, for example, a slotted nut 100 which is internally fluted to enable it to be slipped over the external fluting 98 on the end of screw 52. This nut 100 may be placed on the screw end whenever it is desired to effect a turning of the screw 52 to vary the potentiometer's resistance.

The pair of resilient contacting elements 77, 78 provide a dual contact with the surface of the resistance element at points of contact, which are spaced only a few degrees apart. This spacing is insufficient to effect any noticeable variation in the resistance value of the potentiometer.

The potentiometer is completed by closing the cavity 12 with a pair of plates 46, 48, of dielectric material which plates are preferably of the same width as the block 10, but are slightly longer in length. Each of these plates, as has previously been mentioned, is provided on its side facing the block 10 with a pair of conductive coatings 42, 44, which are in registry with the outwardly facing sides of the contacting members 40 on the fingers 36, 38. The conductive areas 42, 44 are at all times spaced from each other and are preferably brought out to connecting areas 102, 104, disposed on the end 106 of each of the plates 46, 48 to form a terminal strip in the manner best shown in FIG. 1.

The side of each plate 46, 48 which faces the block 10 is further provided with a conductive coating 108, which is spaced from the two conductive coatings 42, 44 and is similarly brought out at 110 on the end 106, as a part of the terminal strip. The conductive area 108 is disposed to extend parallel to the path of movement of the member 50 and to present at all times a contacting surface to one of the resilient contact elements 82, 84 on said member.

A fourth conductive coating 112 may also be provided on the opposite end 114 of each cover plate 46, 48 in order to prevent bulging of the plate when it is compressed against the side of the block 10. The latter is provided with a further bore 116, which extends transversely therethrough and in registry with portions of the conductive areas 108 on the plates 46, 48. These two areas 108 are placed in contact and, hence, in parallel, by means of a gold plated spring 118, which is disposed to extend through the bore 116 and is of such length as to maintain contact at all times between the two areas 108 whenever the plates 46, 48 are in abutment with the sides of the block 10.

It will also be observed that both the block 10 and each of the plates 46, 48 contain registering bores 120, 122 and 124 respectively, whereby the entire assembled unit may be stacked with similarly constructed potentiometers having resistance elements of the same or different ohmage.

One of the plates 46, 48 may be scored, as at 126, to enable such stacking to be accomplished without interference from the back of the adjacent plate, as best seen in FIG. 9.

The outwardly facing side of each plate 46, 48 is preferably copper plated, as at 128, for a distance beginning inwardly of the contacting areas 102, 104 and 110 and extending to the opposite end 114 of the plate. This copper plating 128 may serve to provide some shielding for the potentiometer, but it also provides a surface for spot welding a pair of upper and lower clamping plates 130, 132, which are slipped over the assembled parts in order to hold them together as a complete unit. Such spot welding may be accomplished along the overhang strips 134 which are bent around the block 10.

In use, where a single potentiometer is to be employed in a circuit (not shown), contact leads 138 from the circuit may be soldered or otherwise adhered to the contacting areas 102, 104 and 110 constituting the terminal strip of both plates 46, 48, to provide duplication of contacts for the purpose of increasing reliability of the circuit in which the potentiometer is employed. Where, however, a plurality of potentiometers are to be stacked in the manner shown in FIG. 9, the end 106 of the plate 48 may be snapped off along the score line 126, thereby to enable the circuit lead wires better to be brought in and connected to the terminal strip including the areas 102, 104 and 110 on plate 46. It is possible, however, to make lead connections without snapping off the end 106 of one of the plates, but the making of such connections is somewhat hindered by the presence of the second terminal strip and there is a great possibility that the lead-in wires of adjacent potentiometers may inadvertently touch each other at points where there is no insulation.

From a careful perusal of the foregoing disclosure, it will be appreciated that the described embodiment of the invention constitutes a potentiometer of a very high degree of reliability and a very low rate of failure. This is because provision is made for duplicating all areas or points of contact, not only at the ends of the resistor element and on the surface thereof, but on both sides of the slidable contacting member 50, and when lead connections are made. Thus, if any one of the contacting elements should become faulty, there is always a second area or point of contact or connection. The probability of a simultaneous defect in the duplicating area or point of contact becomes quite remote. This redundancy in contacting and connecting points, therefore, serves to decrease considerably the failure rate of the unit.

It will also be appreciated that the unit may be constructed merely by assembling a group of pre-fabricated parts, each of which may be readily manufactured or punched out by conventional machining, molding and punch techniques. The entire unit, therefore, may be assembled by relatively unskilled labor and without the necessity of soldering or welding fine wires to external leads for the unit. The unit, moreover, may be made of such materials as to render it relatively light in weight. The screw 52 may be of plastic and the contacting member 50 may be punched out of a very thin sheet of conductive metal, such as copper. The dielectric block 10 and the plates 46, 48 may be molded of a lightweight ceramic. Such lightweight construction is of obvious advantage where the unit is to be employed in guided missiles and pilotless aircraft systems.

While the embodiment of the invention which has been disclosed involves the construction of a potentiometer, it will be readily appreciated by those skilled in the art that the principles of construction so taught may be applied to other types of variable electrical units, as for example, variable inductance or capacitance units. All such varied embodiments of the invention are intended to be comprehended within the scope of the invention, as hereinafter claimed.

What is claimed is:

1. A rectilinear potentiometer for use in an electrical circuit, including: a block of dielectric material, said block provided with one end wall and hollowed centrally to provide an elongated cavity, defined by first and second opposed sides in a direction transverse to the end wall; a linear resistance element disposed within said cavity; a screw displaced from the linear resistance element and disposed to extend through the end wall of said block and into said cavity in a direction substantially parallel to said resistance element; a conductive contacting member mounted on said screw within said cavity for slidable movement relative to said screw upon rotation of said screw, the slidable movement of the contacting member relative to the screw being in a direction which substantially parallels said element; first and second closing means each closing said cavity on a different one of the first and second sides of said cavity and in a direction transverse to the end of said cavity, each of said first and second closing means being of dielectric material and having an inner surface facing the cavity and provided with at least one area of a conductive coating, said area extending parallel and adjacent to said linear resistance element, said member having means to effect simultaneous slidable contact with said resistance element and said coatings on said first and second closing means; and conduit means electrically coupled to said resistance element and said conductive coatings to enable said resistance element and said conductive coatings to be connected in the electrical circuit.

2. A rectilinear potentiometer for use in an electrical circuit, including: a block of dielectric material, said block being provided with an end wall and being hollowed centrally to provide an elongated cavity defined by first and second opposed sides in a direction transverse to the end wall; a linear resistance element disposed within said cavity; a screw extending through the end wall of said block and into said cavity in a direction substantially parallel to said resistance element; a conductive contacting member, said member being mounted on said screw for slidable movement relative to said screw upon rotation of said screw, said slidable movement of said member relative to said screw being in a direction which substantially parallels said element; first and second means closing said cavity on a different one of the first and second slides of said cavity and in a direction transverse to the end wall of the block, each of the first and second closing means being of dielectric material and having an inner surface facing the cavity and provided with a first conductive coating, said first conductive coating extending adjacent to said contacting member in a direction parallel to the direction of movement of said contacting member relative to said screw, said contacting member having means effecting simultaneous slidable contact with said resistance element at two adjacent points; each of said inner surfaces further being provided with a second pair of conductive coatings electrically isolated from the first conductive coatings on said surface; means electrically connecting a first extremity of the resistance element to said first conductive coatings and electrically connecting a second extremity of the resistance element to said second conductive coatings, said second extremity of the resistance element being opposite to the first extremity of the resistance element; and conduit means electrically coupled to said first and second conductive coatings to obtain a connection of the conductive coatings in the electrical circuit.

3. A linear potentiometer for use in an electrical circuit, including: a block of dielectric material, said block being provided with first and second opposed sides and with an end wall in a direction transverse to the opposed sides and being hollowed centrally to provide an elongated cavity extending from the first side of the block to the second side; a linear resistance element disposed within said cavity; a screw extending through the end wall of said block and into said cavity in a direction substantially parallel to said resistance element; a conductive contacting member mounted on said screw for slidable movement relative to the screw upon rotation of the screw, the slidable movement of the contacting member relative to the screw being in a direction substantially parallel to said resistance element; a pair of closure plates, each of said plates also being of dielectric material and disposed against one of the sides of the block to close the cavity, each plate being provided with an inner face having at least a first conductive coating, said first conductive coating extending parallel to the direction of movement of said contacting member relative to the screw and at positions adjacent to said contacting member, said member having means to effect simultaneous slidable contact with said element and said coatings; means holding said plates in position against the sides of said block; and conduit means electrically coupled to said resistance element and said conductive coatings to enable said resistance element and said conductive coatings to be connected in the electrical circuit.

References Cited in the file of this patent

UNITED STATES PATENTS

| | | |
|---|---|---|
| 2,594,796 | Olah | Apr. 29, 1952 |
| 2,805,307 | Bourns et al. | Sept. 3, 1957 |
| 2,860,216 | Hubbard et al. | Nov. 11, 1958 |
| 2,870,302 | Bourns et al. | Jan. 20, 1959 |